(12) United States Patent
Wong

(10) Patent No.: US 8,407,303 B2
(45) Date of Patent: Mar. 26, 2013

(54) REMOTE EMAIL OR SMS CONTROL OF CE DEVICE SUCH AS TV

(75) Inventor: Ling Jun Wong, San Diego, CA (US)

(73) Assignee: Sony Corporation, Tokyo (JP)

(*) Notice: Subject to any disclaimer, the term of this patent is extended or adjusted under 35 U.S.C. 154(b) by 64 days.

(21) Appl. No.: 12/840,405

(22) Filed: Jul. 21, 2010

(65) Prior Publication Data
US 2011/0087348 A1    Apr. 14, 2011

Related U.S. Application Data

(60) Provisional application No. 61/251,080, filed on Oct. 13, 2009.

(51) Int. Cl.
G06F 15/16 (2006.01)
(52) U.S. Cl. ........ 709/206; 709/218; 709/203; 709/205; 709/208; 709/209
(58) Field of Classification Search .......... 709/206, 709/205, 203, 208, 209, 218
See application file for complete search history.

(56) References Cited

U.S. PATENT DOCUMENTS

| 6,393,297 | B1 | 5/2002 | Song |
| 2009/0061907 | A1* | 3/2009 | Richardson et al. .......... 455/458 |
| 2010/0217800 | A1* | 8/2010 | Siegel et al. .................. 709/203 |
| 2010/0298011 | A1* | 11/2010 | Pelley et al. .................. 455/466 |
| 2011/0077947 | A1* | 3/2011 | Beauregard et al. .......... 704/275 |
| 2011/0283240 | A1* | 11/2011 | Kautto-Koivula et al. ... 715/853 |

FOREIGN PATENT DOCUMENTS

| KR | 736098 | 6/2007 |
| KR | 9074657 | 7/2009 |
| WO | 03024107 | 3/2003 |
| WO | 2005096608 | 10/2005 |
| WO | 2006120338 | 11/2006 |

OTHER PUBLICATIONS

"Text Message to TV", http://sms.ee.proj.usd.googlepages.com/FinalPreliminaryDesignReview.pdf; Nov. 30, 2007.
Derek Sooman, "Sky Lets You Record TV Shows Via SMS", http://www.techspot.com/news/22122-sky-lets-you-record-tv-shows-via-sms.html; Jul. 6, 2006.
"How to Control TiVo With Text Message?", http://informationmadness.com/cms/technology/tech-tips/1282-how-to-control-tivo-with-text-message.html; Jan. 14, 2009.

* cited by examiner

Primary Examiner — Lan-Dai T Truong
(74) Attorney, Agent, or Firm — John L. Rogitz

(57) ABSTRACT

A user can control a CE device such as a TV using another CE device to send email or text message commands to an Internet server, which relays the commands to the device to be controlled when polled.

13 Claims, 1 Drawing Sheet

US 8,407,303 B2

REMOTE EMAIL OR SMS CONTROL OF CE DEVICE SUCH AS TV

This application claims priority to U.S. provisional patent application 61/251,080, filed Oct. 13, 2009.

I. FIELD OF THE INVENTION

The present application relates generally to remote email or short message service (SMS) control of consumer electronics (CE) devices such as TVs.

II. BACKGROUND OF THE INVENTION

The TV has become a network device, and is a device of abundant content since it has content provided by many sources like a cable company, media content on disc, and on digital recorders that typically include hard disk drives (HDD). However, to exploit all the capabilities of a TV, i.e., to control it, a person must typically be within the range of a TV remote control (RC), in other words, co-located with the TV for practical purposes.

As understood herein, however, a TV user who is absent from the home or other place where the TV is located may nonetheless wish to control at least some aspects of the TV. For example, a user on the move may be concerned that he might have left the TV on, or might not arrive home in time to view or record a TV program. Or, the user may wish to share content from his TV with a friend while in the friend's home.

SUMMARY OF THE INVENTION

Accordingly, a method includes sending, from a control device, short message service (SMS) messages or emails to a server. The SMS messages or emails contain operational commands intended for a remote audio video (AV) device. The method also includes controlling the remote AV device by means of the SMS messages or emails as well as receiving command completion status messages back from the AV device through the server.

If desired, the server may send the commands to the AV device only when polled by the AV device. The AV device may be a TV. In some embodiments the control device sends an identity of the AV device to the server along with the commands the user desires to be executed by the AV device. A command may be for the AV device to turn on, turn off, or to record a TV channel specified in the command.

In another aspect, an Internet server includes a processor and a non-transitory computer readable medium accessible to the processor and bearing instructions causing the processor to receive a text message or email from a control device containing destination AV device identifying information and at least one command. The processor parses the text message or email to extract the information and command and then encapsulates the command in an extensible markup language (XML) message. The server next sends the XML message to the AV device.

In another aspect, a control device includes a housing, a display on the housing, a network interface, and a processor in the housing controlling the display and communicating through the network interface. The processor executing logic which includes receiving user input representing at least one command to an audio video (AV) device remote from the control device. The logic also includes sending the command via the network interface to an Internet server.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
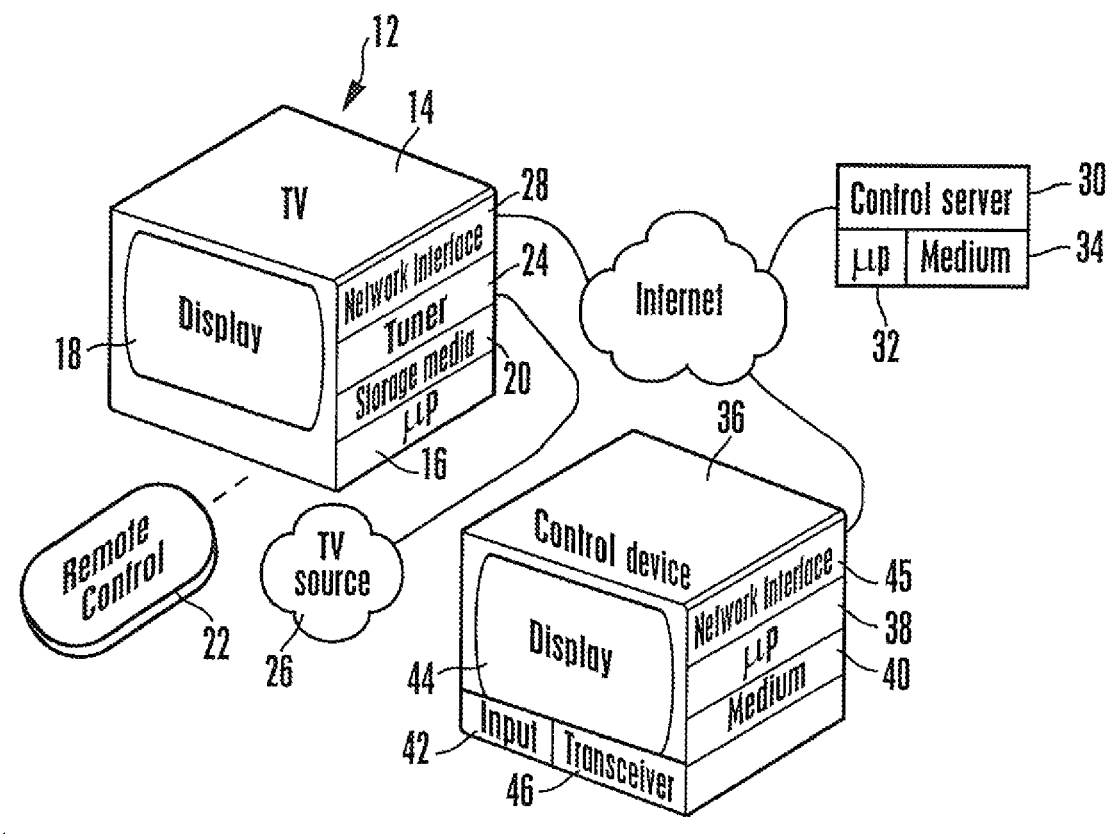
FIG. 1 is a block diagram of an example system in accordance with present principles.

Referring initially to FIG. 1, a consumer electronics (CE) device 12 such as a TV, game player, video disk player, camera, digital clock radio, mobile telephone, personal digital assistant, laptop computer, etc. includes a portable lightweight plastic housing 14 bearing a digital processor 16. The processor 16 can control a visual display 18 and an audible display such as one or more speakers. The processor 16 may access a media player module such that the CE device 12 has media decoding capability.

To undertake present principles, the processor 16 may access one or more computer readable storage media 20 such as but not limited to RAM-based storage, a chip implementing dynamic random access memory (DRAM)) or flash memory or disk storage. Software code implementing present logic executable by the CE device 12 may be stored on one of the memories shown to undertake present principles.

The processor 16 can receive user input signals from various input devices, including a wireless remote control (RC) 22, a point and click device such as a mouse, a keypad, etc. A TV tuner 24 may be provided in some implementations particularly when the CE device is embodied by a TV to receive TV signals from a TV broadcast signal source 26 such as a set-top box, satellite receiver, cable head end, terrestrial TV signal antenna, etc. The TV tuner 24 may be implemented in a set top box separately housed from the TV and communicating therewith. In other embodiments, no TV tuner may be provided. Signals from the tuner 24 are sent to the processor 16 for presentation on the display 18 and speakers.

As shown in FIG. 1, a network interface 28 such as a wired and/or wireless modem communicates with the processor 16 to provide connectivity to a control server 30 on the Internet. The server 30 has a processor 32 and a tangible non-transitory computer readable storage medium 34 such as disk-based and/or solid state storage.

The owner and/or user of the CE device 12 typically accesses a control CE device 36 such as but not limited to a wireless telephone, a personal digital assistant, a laptop computer, etc. The control device 36 includes a processor 38 accessing a non-transitory storage medium 40 to receive user input commands from one or more input devices 42 such as keypads, mice, etc. and to present images on a visual display 44 such as a matrix display. In some implementations, the control device 36 has a network interface 45 communicating with the Internet as shown, with the network interface 45 being a data-optimized interface such as a WiFi interface or other appropriate wired or wireless computer modem or interface. In addition to or in lieu of the network interface 45, the control device 36 may include a wireless telephony transceiver 46 through which voice and text messages such as short message service (SMS) messages may be sent to the telephony network. Without limitation, the telephony transceiver 46 may be a code division multiple access (CDMA) transceiver or variant, a global system for mobile communications (GSM) transceiver or variant, an orthogonal frequency division multiplex (OFDM) transceiver or variant, a frequency division multiple access (FDMA) transceiver, a time division multiple access (TDMA) transceiver, a space division multiple access (SDMA) transceiver, etc.

Figure 2:
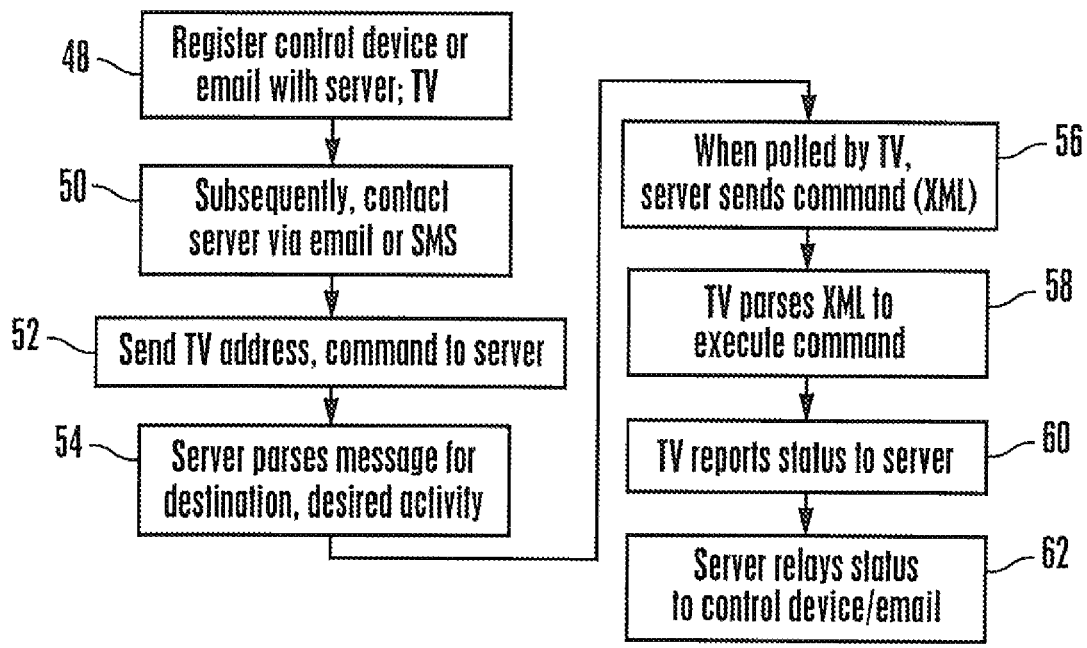
FIG. 2 is a flow chart of example logic.

Present principles may be appreciated in reference to FIG. 2. Commencing at block 48, the control device 36 is registered with the control server 30. Registration may include providing the network address/email address and/or telephone number of the control device 36 along with the user's personal information, e.g., user name and password, and accounting information, e.g., credit card number. Also, the name with network address and/or telephone number of the TV 12 may be provided to the control server 30. In essence, registration includes conveying sufficient information to the control server 30 for the control server 30 to receive the below-described remote TV commands from the control device 36 and relay those commands to the TV 12.

Proceeding to block 50, when it is desired to control the TV 12 using the control device 36, the user establishes communication between the control device 36 and control server 30 by, e.g., sending an SMS message using the telephony transceiver 46 to the server 30 or by sending an email by means of the network interface 45 to the server 30. At block 52, the control device 36 sends the identity of the TV 12 sought to be controlled, e.g., its address or telephone number, to the server 30 along with the commands the user desires to be executed by the TV processor 16. The commands may be formatted in one non-limiting implementation as follows (with explanatory comments between brackets):
Body of Message:
Title: TV #123 Control
command: TV Power On <turns TV on>
command: TV Record Video, Channel: 63, Time:1700-1900 <tells TV to record video on channel 63 from 5 pm to 7 pm>
command: help <the server returns a list of help commands>

At block 54 the server 30 parses the message for the title (which determines the device for the command to act on), as well as the commands. If the command is "help", the server replies to the control device 36 by sending the device 36 a help list. Note that other forms of help that are related to the TV may be provided, e.g., the program guide, etc. Thus, the user can request the program guide associated with the TV so that the user need not remember which channel is the Discovery channel, or what time it will be on air. Moreover, "smart" instruction responses may be provided which do not require a fixed format. For example, an instruction to "record channel 63 at 5.30 pm" is interpreted the same as "record 63 channel at 1730" and "record Discovery Channel at 530 pm", assuming that channel 63 corresponds to Discovery channel. All three commands are provided with the same response, in this case, channel 63 will start to be recorded at 5:30 in the afternoon. Such "smart" responses may be facilitated by compiling a table of equivalent commands and associating sets of equivalent commands in records of the table with the appropriate response appertaining to the set.

After parsing the commands, the server 30 encapsulates and stores the commands in extensible markup language (XML) format such that they may be available for the TV 12 to retrieve the next time the TV 12 polls the server (e.g., at block 56) for new commands. In other words, block 56 indicates that the TV 12 may periodically poll the server 30 for new commands. If there is an instruction, at block 58 the TV 12 receives its intended XML message from the server containing the command or commands. It is to be understood that in other embodiments the server 30 may simply send the commands to the TV 12 as soon as it can after receipt from the control device 36.

Proceeding to block 58, the TV 12 parses the XML response from the server and executes the commands contained within the response. The commands so executed may include, e.g., turning on the TV, and setting the TV to record a TV program on channel 63.

Moving to block 60, after performing the commands, the TV 12 may send a status message to the server 30 indicating completion of the command, or indicating that the command has begun to be executed but has not yet been completed and why. For example, a status report for the "turn on" command may be "complete" whereas a status report for a record command may be "recording started but not yet complete due to program not being complete", or words to that effect. In this latter case, the TV 12 may send a second status message after its done recording to the server 30, with details such as "action complete". The server then returns an "action complete" message to the control device 36, which can display the status messages to the user by means of the display 44. Block 62 indicates that the control server 30 relays status messages from the TV 12 to the control device 36.

It may now be appreciated that present principles, in addition to the advantages above, permit remote content sharing by the user's TV. For example, if the user is at a friend's place and would like to share some content on his/her TV, the user can still do it in accordance with principles set forth above by turning the TV on, activating the content sharing feature, and then turning the TV off when he/she is done sharing content. Furthermore, because the mobile control device 36 need not be dependent on the availability of Internet network connections when SMS is provided, the TV 12 may be remotely controlled anywhere wireless telephony access is available. Should the user choose to use an Internet connection to realize present principles, such a feature remains possible using the above-described email option.

While the particular REMOTE EMAIL OR SMS CONTROL OF CE DEVICE SUCH AS TV is herein shown and described in detail, it is to be understood that the subject matter which is encompassed by the present invention is limited only by the claims.

What is claimed is:
1. Method comprising:
sending, from a control device, short message service (SMS) messages or emails to a server, the SMS messages or emails containing operational commands intended for a remote audio video (AV) device;
controlling the remote AV device by means of the SMS messages or emails;
wherein the operational command is compared by the server to a table containing at least one set of equivalent commands that are formatted differently but contain the same instruction, the server associating the at least one operational command in an extensible markup (XML) message with a "smart" command to be encapsulated using the table; wherein
a set of equivalent commands are associated in the table with a "smart" command embodying an instruction that is the same as the instruction included in the equivalent commands in the set.
2. The method of claim 1, wherein the server sends the commands to the AV device only when polled by the AV device.
3. The method of claim 1, wherein the AV device is a TV.
4. The method of claim 1, wherein the control device sends SMS messages to the server to control the AV device.
5. The method of claim 1, wherein the control device sends emails to the server to control the AV device.

6. The method of claim 1, wherein the control device sends an identity of the AV device to the server along with the commands the user desires to be executed by the AV device.

7. The method of claim 1, wherein a command is for the AV device to turn on.

8. The method of claim 1, wherein a command is for the AV device to turn off.

9. Server comprising:

processor;

non-transitory computer readable medium accessible to the processor and bearing instructions causing the processor to:

receive a text message or email from a control device containing destination AV device identifying information and at least one command;

parse the text message or email to extract the information and command;

encapsulate at least one "smart" command associated with the extracted command in an extensible markup language (XML) message; and send the XML message to the AV device; wherein the at least one command that is extracted is compared by the server to a table containing at least one set of equivalent commands that are formatted differently but contain the same instruction, the server associating the at least one extracted command with a "smart" command to be encapsulated using the table; wherein a set of equivalent commands are associated in the table with a "smart" command embodying an instruction that is the same as the instruction included in each of the equivalent commands in the set.

10. The server of claim 9, wherein the AV device is a TV and the server sends the XML message to a network address associated with the TV.

11. The server of claim 9, wherein the server receives a text message from the control device containing the destination AV device identifying information and the at least one command.

12. The server of claim 9, wherein the server receives an email from the control device containing the destination AV device identifying information and the at least one command.

13. The server of claim 9, wherein the server further relays command completion status messages from the AV device to the control device.

* * * * *